(12) United States Patent
Bixby

(10) Patent No.: US 11,766,318 B2
(45) Date of Patent: Sep. 26, 2023

(54) DENTAL FLOSSER

(71) Applicant: Lori Bixby, Troy, OH (US)

(72) Inventor: Lori Bixby, Troy, OH (US)

( * ) Notice: Subject to any disclaimer, the term of this patent is extended or adjusted under 35 U.S.C. 154(b) by 217 days.

(21) Appl. No.: 15/831,725

(22) Filed: Dec. 5, 2017

(65) Prior Publication Data

US 2019/0167398 A1    Jun. 6, 2019

(51) Int. Cl.
*A61C 15/00* (2006.01)
*A61C 15/04* (2006.01)
*A46B 15/00* (2006.01)

(52) U.S. Cl.
CPC .......... *A61C 15/046* (2013.01); *A61C 15/043* (2013.01); *A46B 15/0071* (2013.01); *A61C 15/042* (2013.01)

(58) Field of Classification Search
CPC ... A61C 15/043; A61C 15/046; A61C 15/042; A61C 15/047; A61C 15/00; A61C 15/04; A61C 15/041; A46B 15/0071; B65H 75/00; B65H 75/10; B65H 75/14; B65H 75/26; B65H 75/28; B65H 75/285; B65H 75/4431; B65H 75/4436
USPC ......... 132/323, 324, 326, 329, 325; D28/65, D28/66, 68; D24/152, 176; D9/419, D9/423, 443, 450, 501
See application file for complete search history.

(56) References Cited

U.S. PATENT DOCUMENTS

| | | | |
|---|---|---|---|
| 1,512,633 A | * | 10/1924 | Peckham ............. A61C 15/046 132/325 |
| D231,199 S | | 4/1974 | Fortune |
| 3,804,102 A | * | 4/1974 | Bennington ......... A61C 15/043 132/321 |
| 3,870,059 A | | 3/1975 | Bennington |
| D237,498 S | | 11/1975 | Bennington |
| 4,214,598 A | * | 7/1980 | Lee ...................... A61C 15/046 132/325 |
| 4,434,807 A | | 3/1984 | Huskey |
| 4,901,742 A | * | 2/1990 | Olson .................. A61C 15/046 132/325 |
| 5,183,065 A | | 2/1993 | Mason |

(Continued)

FOREIGN PATENT DOCUMENTS

KR    20090105998 A    10/2009

OTHER PUBLICATIONS

European Patent Office, International Search Report and Written Opinion of the International Searching Authority, International Application No. PCT/US2018/063790, dated Mar. 6, 2019 (13 pages).

*Primary Examiner* — Rachel R Steitz
(74) *Attorney, Agent, or Firm* — Frost Brown Todd LLP

(57) ABSTRACT

In one embodiment, a dental flosser includes a handle and a housing coupled to the handle. The housing includes a chamber for rotatably receiving a spool having first top and bottom surfaces and a side surface and having a supply of floss wound about the side surface, the supply of floss having second top and bottom surfaces. The housing further includes a floss orifice for directing at least a portion of the supply of floss therethrough. The dental flosser also includes an actuator including at least one contact surface configured to frictionally engage at least one of the first top surface, the first bottom surface, the second top surface, or the second bottom surface. The actuator further includes a biasing member for biasing the at least one contact surface relative to the spool.

20 Claims, 7 Drawing Sheets

(56) References Cited

U.S. PATENT DOCUMENTS

| | | | |
|---|---|---|---|
| 5,417,232 A * | 5/1995 | Ballard | A61C 15/046 |
| | | | 132/325 |
| 5,680,875 A * | 10/1997 | Winters | A61C 15/043 |
| | | | 132/323 |
| 6,895,977 B2 | 5/2005 | Guo | |
| 7,322,367 B2 | 1/2008 | Paz-Soldan | |
| 8,813,763 B2 * | 8/2014 | Lee | A61C 15/043 |
| | | | 132/325 |
| 9,016,287 B2 | 4/2015 | Nibbe | |
| 2007/0235057 A1 | 10/2007 | Liu | |
| 2011/0041870 A1 | 2/2011 | Kalbfeld et al. | |
| 2013/0074869 A1 | 3/2013 | Lee | |
| 2013/0213432 A1 | 8/2013 | Lee | |

\* cited by examiner

DENTAL FLOSSER

FIELD OF THE INVENTION

The present invention relates generally to personal hygiene products and, more particularly, to dental flossers designed for flossing a user's teeth.

BACKGROUND OF THE INVENTION

Dental floss is used to remove food and dental plaque from between an individual's teeth in order to prevent dental disease, such as gingivitis, from developing in the individual's mouth. Thus, flossing is widely recognized as an important part of dental hygiene. However, many individuals consider dental flossing to be a relatively complicated and time-consuming operation, and therefore floss their teeth rarely and/or reluctantly. In this regard, flossing requires a relatively high level of dexterity.

For example, conventional spooling-type floss dispensers require the individual to unwind a portion of floss from the dispenser, pull the floss against a blade of the dispenser to cut the portion of floss, and then grip the portion of floss between and/or around their fingers with one end of the portion in each hand, to guide the portion of floss between each pair of teeth. Gripping the portion of floss with both hands and accurately guiding the portion of floss between teeth can be particularly difficult due to the thin nature of the floss, the flexibility of the floss, and/or the moisture present in the individual's mouth.

Also, conventional pick-type floss holders are poorly suited for flossing certain teeth, such as rear molar teeth, due to the manipulation angles required to guide the floss held by the holder between pairs of teeth. In addition, such holders are usually intended to be used once and then disposed of in their entirety, including the handle portion, which is typically plastic, thereby resulting in undesirable excess waste.

Thus, it would be desirable to provide a reusable device for providing easier flossing with a lower dexterity requirement.

SUMMARY OF THE INVENTION

In one embodiment, a dental flosser includes a handle and a housing coupled to the handle. The housing includes a chamber for rotatably receiving a spool having first top and bottom surfaces and a side surface and having a supply of floss wound about the side surface, the supply of floss having second top and bottom surfaces. The housing further includes a floss orifice for directing at least a portion of the supply of floss therethrough. The dental flosser also includes an actuator including at least one contact surface configured to frictionally engage at least one of the first top surface, the first bottom surface, the second top surface, or the second bottom surface. The actuator further includes a biasing member for biasing the at least one contact surface relative to the spool.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION OF THE INVENTION

Figure 1:
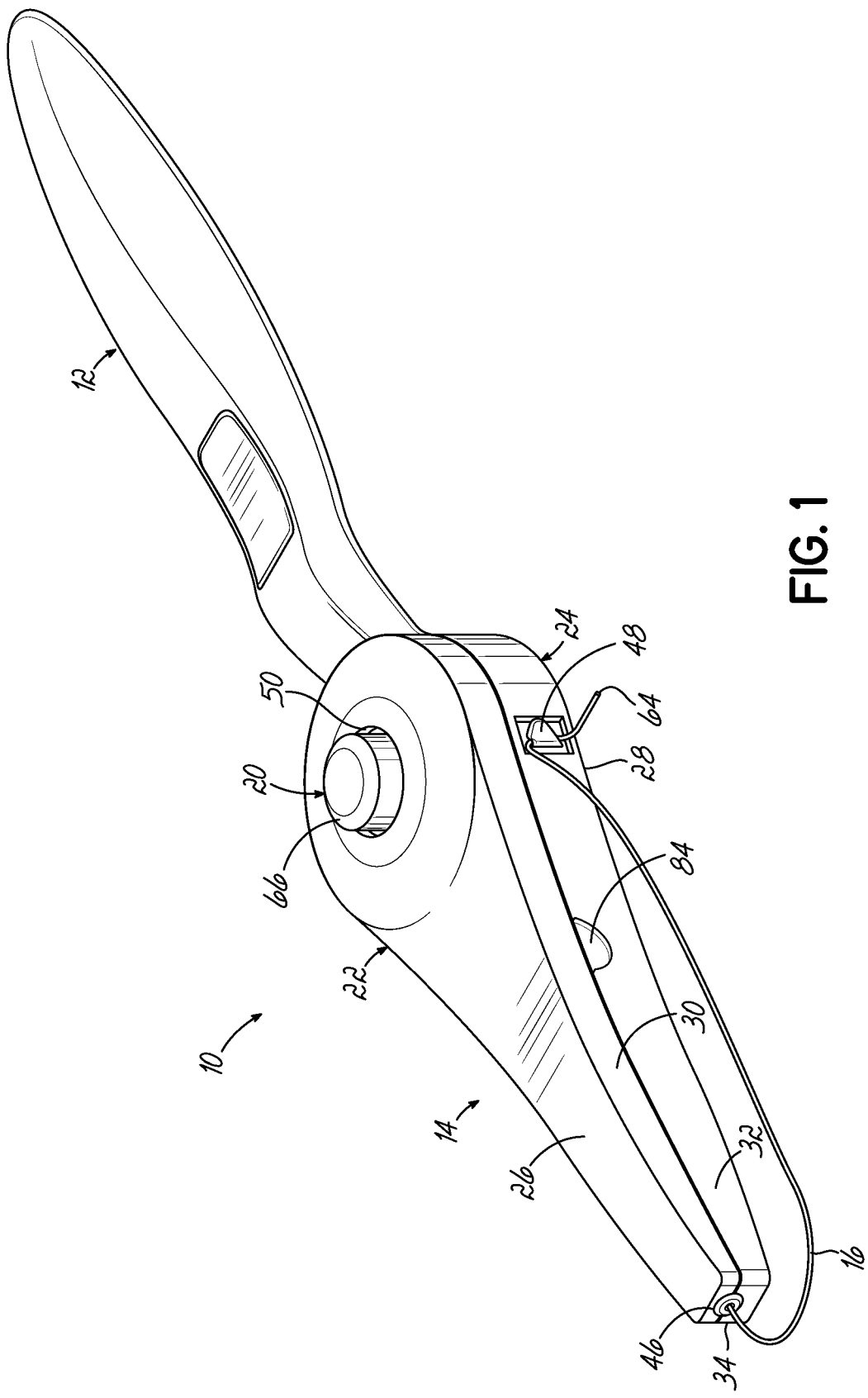
FIG. 1 is a perspective view of an exemplary dental flosser in accordance with an embodiment of the invention.
Figure 2:
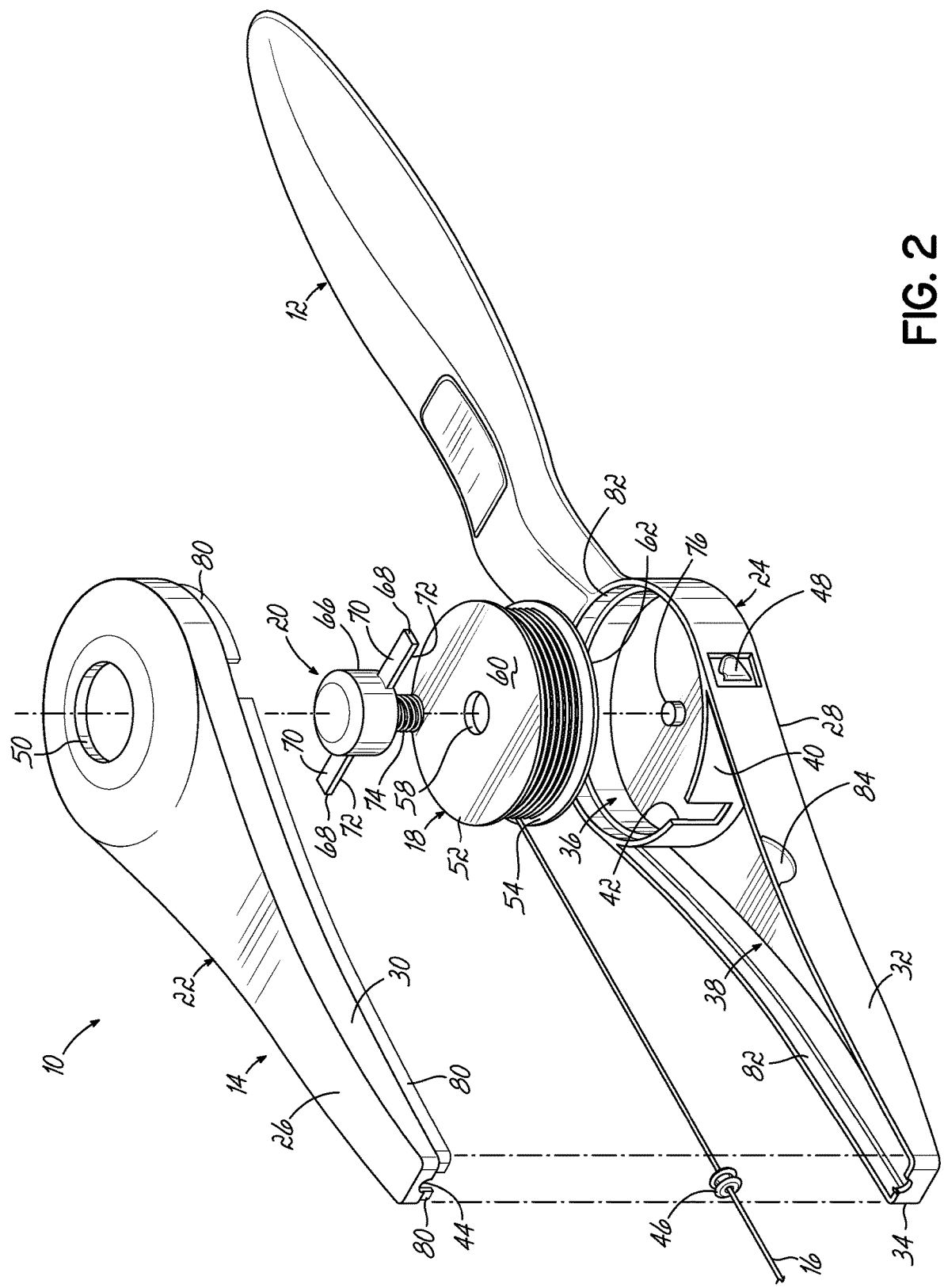
FIG. 2 is an exploded perspective view of the dental flosser of FIG. 1.

With reference to FIG. 1, an exemplary dual-purpose dental floss holder and dispenser, or dental flosser 10, including a handle 12 coupled to a housing 14 for holding and dispensing dental floss 16 is shown in accordance with one embodiment of the present invention. As set forth in further detail below, the housing 14 is configured to receive a bobbin or spool 18 having a supply of floss 16 wound therearound (FIG. 2). The spool 18 is rotatable within the housing 14 such that at least a portion of the supply of floss 16 may be unwound therefrom and exposed from the housing 14 for flossing a user's teeth. The dental flosser 10 includes an actuator 20 for locking and/or unlocking rotation of the spool 18. When the spool 18 is unlocked, the user may expose a desired length of floss 16 from the housing 14 by unwinding a portion of the floss 16 from the spool 18. When the spool 18 is locked, the user may grip the exposed portion of floss 16 with one hand and the handle 12 with the other hand in order to provide an improved flossing experience with a minimal dexterity requirement. The features of the dental flosser 10 are set forth in further detail below to clarify each of these functional advantages and other benefits provided in this disclosure.

Referring now to FIG. 2, with continuing reference to FIG. 1, the illustrated housing 14 includes a top housing portion 22 and a bottom housing portion 24. While relative terms such as "top" and "bottom" are used herein, such terminology is used only with respect to the frame of reference provided in the accompanying drawings, and is not intended to limit the scope of the invention in any way. The top and bottom housing portions 22, 24 are defined by a top wall 26 and a bottom wall 28, respectively, and by respective sidewalls 30, 32. In the embodiment shown, the top and bottom housing portions 22, 24 each have a generally teardrop shape. More particularly, the top and bottom housing portions 22, 24 each have a generally bulbous shape proximate the handle 12 and taper inwardly toward a dispensing end 34 of the housing 14. Together, the top and bottom housing portions 22, 24 define a generally circular chamber 36 and a generally tapered chamber 38 separated from each other by a partition 40. A chamber aperture 42 extends through the partition 40 for allowing floss 16 to pass therethrough.

As shown, the sidewalls 30, 32 of the top and bottom housing portions 22, 24 also define an orifice 44 at the dispensing end 34 of the housing 14 for directing floss 16 from the tapered chamber 38 to the exterior of the housing 14. A seal, such as a grommet 46, may be positioned within the orifice 44 for directing floss 16 therethrough while preventing foreign material such as saliva from entering the tapered chamber 38 from the exterior of the housing 14. The grommet 46 may be constructed of a rubber material or any other material suitable for sealing the space between the periphery of the orifice 44 and the floss 16 extending therethrough. In the embodiment shown, a blade 48 for cutting a portion of the floss 16 is provided on the sidewall 32 of the bottom housing portion 24 substantially distal from the dispensing end 34. The blade 48 may also be used to hold a portion of the floss 16 on the exterior of the housing 14. As shown, the top housing portion 22 also includes an aperture 50 extending through the top wall 26 and aligned with the chamber 36, the purpose of which will be described in greater detail below.

In the embodiment shown, the handle 12 and the bottom housing portion 24 are integrally formed together as a unitary piece. Alternatively, the handle 12 and the bottom housing portion 24 may be separately formed as individual pieces and coupled together. In one embodiment, the handle 12 and/or housing 14 may be constructed of a plastic material.

The spool 18 of floss 16 is rotatably received in the chamber 36 of the housing 14. In the embodiment shown in FIG. 2, the spool 18 is flanged. More particularly, the spool includes top and bottom flanges 52, 54 extending radially outwardly from a hollow cylindrical body having an inner bore 58 and an outer side surface (not shown). The top and bottom flanges 52, 54 may include generally circular top and bottom surfaces 60, 62, respectively. The supply of floss 16 is wound about the side surface of the cylindrical body, and at least a portion of the supply of floss 16 extends from the spool 18 through the chamber aperture 42, the tapered chamber 38, and the orifice 44 to the exterior of the housing 14, such that pulling the free end 64 of the floss 16 away from the spool 18 may cause the spool 18 to rotate, thereby allowing additional portions of floss 16 to unwind from the spool 18 and advance through the orifice 44. As shown, the flanges 52, 54 may each have a cross dimension similar to that of the chamber 36 so that the close fit of the flanges 52, 54 with the sidewalls 30, 32 and/or partition 40 may assist the spool 18 in remaining substantially centered within the chamber 36. Alternatively, the spool may comprise the hollow cylindrical body itself, i.e., without the top and bottom flanges 52, 54, as described in detail below in connection with the dental flosser embodiment of FIG. 4.

While the body of the spool 18 has been described as being hollow and cylindrical in one embodiment, it will be understood by those of ordinary skill in the art that the body of the spool 18 may alternatively be solid or partially hollow, and have other cross-sectional shapes than cylindrical.

The illustrated actuator 20 includes a generally cylindrical button 66 extending through the aperture 50 of the top housing portion 22. Alternatively, the actuator 20 may include a soft or living button formed of a resilient piece of material, a flexible film, or a thinned area of the material forming the top housing portion 22, defined in an area of the top housing portion 22, such that the aperture 50 may be eliminated. In any event, the actuator 20 further includes at least one projection, such as a pair of oppositely disposed arms 68, extending radially outwardly from the button 66. The arms 68 each include top and bottom surfaces 70, 72, and are positioned above the spool 18 such that the bottom surfaces 72 of the arms 68 oppose the top surface 60 of the spool 18. In this manner, the bottom surfaces 72 of the arms 68 may be configured to frictionally engage the top surface 60 of the spool 18 to lock the spool 18 against rotation and thereby halt and/or prevent the unwinding of floss 16 from the spool 18. Thus, the frictional engagement between the bottom surfaces 72 of the arms 68 and the top surface 60 of the spool 18 may at least partially define a locked condition of the spool 18. In one embodiment, the frictional engagement between the bottom surfaces 72 of the arms 68 and the top surface 60 of the spool 18 may cause the bottom surface 62 of the spool 18 to frictionally engage the bottom wall 28 of the housing 14. In this manner, the spool 18 may be sandwiched between the arms 68 and the bottom wall 28 to further contribute to the locking of the spool 18 against rotation. In any event, when the spool 18 is in the locked condition, the free end 64 of the floss 16 may be held taut by the user without causing rotation of the spool 18 and unwinding of the supply of floss 16.

The actuator 20 also includes a biasing member, such as a spring 74, positioned between the button 66 and the housing 14 for biasing the button 66, and more particularly the bottom surfaces 72 of the arms 68, away from the spool 18 such that the spool 18 may be freely rotatable. In the embodiment shown, the spring 74 extends through the inner bore 58 of the spool 18 and is positioned over a guide pin 76 provided on the bottom wall 28. The biasing of the bottom surfaces 72 of the arms 68 away from the spool 18 by the spring 74 may define an unlocked condition of the spool 18. When the spool 18 is in the unlocked condition, the top surfaces 70 of the arms 68 may each abut the top wall 26 near the aperture 50 to prevent the button 66 from becoming dislodged.

In the embodiment shown, the spool 18 is normally in the unlocked condition. In other words, absent a threshold external force on the button 66, the biasing of the bottom surfaces 72 of the arms 68 caused by the spring 74 prevents the bottom surfaces 72 from frictionally engaging the top surface 60 of the spool 18. Upon the application of an external force on the button 66 sufficient to overcome the biasing caused by the spring 74, the button 66 may be depressed toward the bottom wall 28 such that the bottom surfaces 72 of the arms 68 move toward and frictionally engage the top surface 60 of the spool 18 to place the spool 18 in the locked condition. Such an external force may be generated, for example, by a user's finger or thumb while gripping the handle 12 with a single hand. Removal of the external force on the button 66 may allow the bottom surfaces 72 of the arms 68 to be urged away from and disengage the top surface 60 of the spool 18 by the biasing of the spring 74 to return the spool 18 to the unlocked condition.

In use, the user may expose a desired length of floss 16 from the housing 14 by pulling the free end 64 of the floss 16 away from the spool 18 while the spool 18 is in the normal, unlocked condition, thereby allowing portions of the floss 16 to unwind from the spool 18 and advance out of the orifice 44. Once the desired length of floss 16 has been exposed, the user may depress the button 66 with a thumb or finger to overcome the bias of the spring 74 and cause the bottom surfaces 72 of the arms 68 to frictionally engage the top surface 60 of the spool 18, thereby locking the spool 18. The user may then guide the exposed portion of floss 16 between the user's teeth by gripping the exposed floss 16 with one hand, such as at or near the free end 64 of the floss 16, and gripping the handle 12 of the flosser 10 with the other hand, while continuing to depress the button 66 to maintain the spool 18 in the locked condition. Thus, the user need only directly grip the floss 16 with one hand and may easily manipulate the flosser 10 with the other hand, thereby reducing the amount of dexterity required to perform the flossing operation. In this regard, the handle 12 of the flosser 10 may have an ergonomic configuration similar to that of a toothbrush. It will be appreciated that the user may position the dispensing end 34 of the housing 14 proximal to each pair of teeth being flossed, such as directly within the user's mouth, in order to provide accurate guiding of the floss 16. In doing so, the grommet 46 may prevent saliva or debris from entering the housing 14 of the flosser 10.

Once the exposed portion of floss 16 has been spent, the user may release the button 66 to unlock the spool 18 and may subsequently pull additional portions of fresh floss 16 from the spool 18 to continue the flossing operation. In addition or alternatively, the user may cut away the spent portion of floss 16, such as via the blade 48 attached to the housing 14. It will be appreciated that the distal positioning of the blade 48 from the dispensing end 34 may maintain the blade 48 at a comfortable distance away from the user's mouth during the flossing operation. However, the blade 48 may be positioned elsewhere on the flosser 10, or may be eliminated without departing from the scope of the invention.

In the embodiment shown, the top housing portion 22 is at least partially removable from the bottom housing portion 24 such that the contents of the housing 14 may be accessible by opening the housing 14, such as for maintenance and/or replacement of the components housed therein. In this regard, the top and bottom housing portions 22, 24 include complementary flanges 80 and recesses 82 on their respective sidewalls 30, 32 for providing a snap-fit therebetween. Thus, the user may unsnap the top housing portion 22 from the bottom housing portion 24 to open the housing 14 in order to replace the spool 18 of floss 16, for example, and subsequently re-snap the top housing portion 22 to the bottom housing portion 24 to close the housing 14 and resume using the flosser 10. A notch 84 may be provided on the sidewall 32 of the bottom housing portion 24 adjacent the interface with the top housing portion 22 for receiving the tip of the user's thumb or finger in order to assist the user in wedging the top housing portion 22 away from the bottom housing portion 24. In this manner, the user may continue to make use of the flosser 10 with a replacement spool 18 after the supply of floss 16 of an initial spool 18 has been depleted, rather than disposing of the flosser 10 in its entirety. It will be appreciated that various other configurations of the housing 14 may be used to provide access to the contents of the housing 14. For example, the top and bottom housing portions 22, 24 may be hingedly coupled to each other.

In another embodiment, the top and bottom housing portions 22, 24 may be configured to be substantially permanently attached to each other. In such cases, the flosser 10 may be disposed of in its entirety after the supply of floss 16 of the initial spool 18 has been depleted.

Various other modifications may be made to the exemplary flosser shown in FIGS. 1 and 2 without departing from the scope of the invention. For example, the partition 40 may be eliminated. In such cases, the sidewalls 30, 32 of the top and bottom housing portions 22, 24 may be configured to maintain the alignment of the spool 18 within the chamber 36. In addition or alternatively, the actuator 20 may assist in maintaining the alignment of the spool 18 within the chamber 36.

Figure 3:
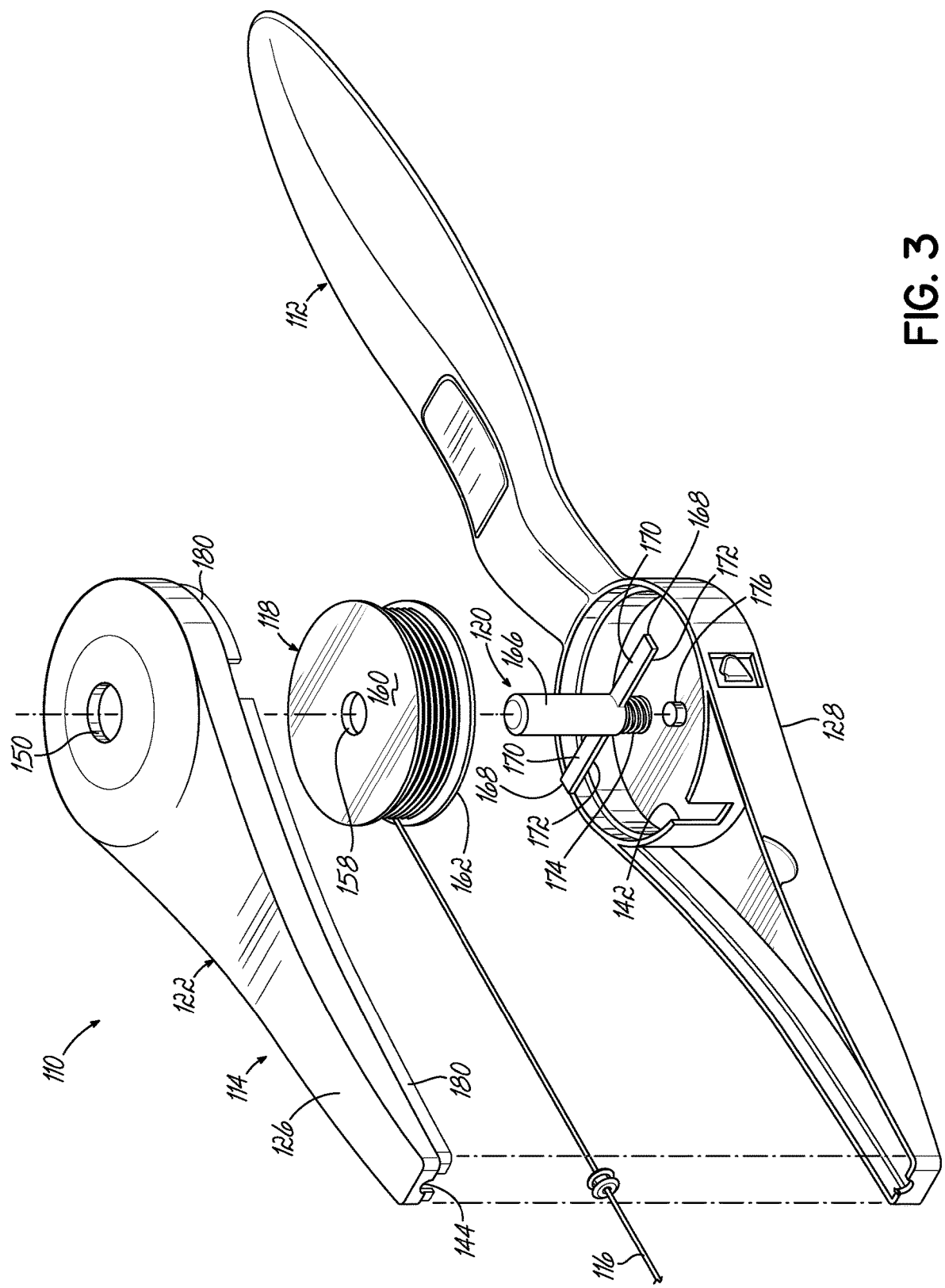
FIG. 3 is an exploded perspective view of an exemplary dental flosser in accordance with another embodiment of the invention.

Turning now to FIG. 3, wherein like reference numerals represent like features, an exemplary dual-purpose dental floss holder and dispenser, or dental flosser 110, including a handle 112 coupled to a housing 114 for holding and dispensing dental floss 116 is shown in accordance with another embodiment. The primary difference between the flosser 110 of this embodiment and the flosser 10 of the previously described embodiment is the configuration of the actuator 120. More particularly, the actuator 120 of this embodiment includes a generally cylindrical button 166 extending through the inner bore 158 of the spool 118 and the aperture 150 of the top housing portion 122. The actuator 120 further includes at least one projection, such as a pair of oppositely disposed arms 168, extending radially outwardly from the button 166. The arms 168 each include top and bottom surfaces 170, 172, and are positioned below the spool 118 such that the top surfaces 170 of the arms 168 oppose the bottom surface 162 of the spool 118. In this manner, the top surfaces 170 of the arms 168 may be configured to frictionally engage the bottom surface 162 of the spool 118 to lock the spool 118 against rotation and thereby halt and/or prevent the unwinding of floss 116 from the spool 118. Thus, the frictional engagement between the top surfaces 170 of the arms 168 and the bottom surface 162 of the spool 118 may at least partially define a locked condition of the spool 118. In one embodiment, the frictional engagement between the top surfaces 170 of the arms 168 and the bottom surface 162 of the spool 118 may cause the top surface 160 of the spool 118 to frictionally engage the top wall 126 of the housing 114. In this manner, the spool 118 may be sandwiched between the arms 168 and the top wall 126 to further contribute to the locking of the spool 118 against rotation. In any event, when the spool 118 is the locked condition, the free end of the floss 116 may be held taut by the user without causing rotation of the spool 118 and unwinding of the supply of floss 116.

The actuator 120 also includes a biasing member, such as a spring 174, positioned between the button 166 and the housing 114 for biasing the top surfaces 170 of the arms 168 toward, and into frictional engagement with, the bottom surface 162 of the spool 118 such that the spool 118 may be locked against rotation. In the embodiment shown, the spring 174 is below the spool 118 and is positioned over a guide pin 176 provided on the bottom wall 128.

In the embodiment shown, the spool 118 is normally in the locked condition. In other words, absent a threshold external force on the button 166, the biasing of the top surfaces 170 of the arms 168 caused by the spring 174 causes the top surfaces 170 to frictionally engage the bottom surface 162 of the spool 118. Upon the application of an external force on the button 166 sufficient to overcome the biasing caused by the spring 174, the button 166 may be depressed toward the bottom wall 128 such that the top surfaces 170 of the arms 168 move away from and disengage the bottom surface 162 of the spool 118 to place the spool 118 in the unlocked condition. Such an external force may be generated, for example, by a user's finger or thumb while gripping the handle 112 with a single hand. Removal of the external force on the button 166 may allow the top surfaces 170 of the arms 168 to be urged toward and frictionally engage the bottom surface 162 of the spool 118 by the biasing of the spring 174 to return the spool 118 to the locked condition.

In use, the user may expose a desired length of floss 116 from the housing 114 by depressing the button 166 with a thumb or finger to overcome the bias of the spring 174 and cause the top surfaces 170 of the arms 168 to disengage the bottom surface 162 of the spool 118 and unlock the spool 118, while pulling the free end of the floss 116 away from the spool 118, thereby allowing portions of the floss 116 to unwind from the spool 118 and advance out of the orifice 144. Once the desired length of floss 116 has been exposed, the user may release the button 166, thereby allowing the spool 118 to return to the normal, locked position. The user may then guide the exposed portion of floss 116 between the user's teeth by gripping the exposed floss 116 with one hand, such as at or near the free end of the floss 116, and gripping the handle 112 of the flosser 110 with the other hand. Thus, in this embodiment, the need to continue to depress the button 166 to maintain the spool 118 in the locked condition while performing the flossing operation is eliminated.

Various other aspects of the flosser 110 are similar to those described above with regard to the previous embodiment and will be readily understood, and thus are not repeated here for the sake of brevity.

Figure 4:
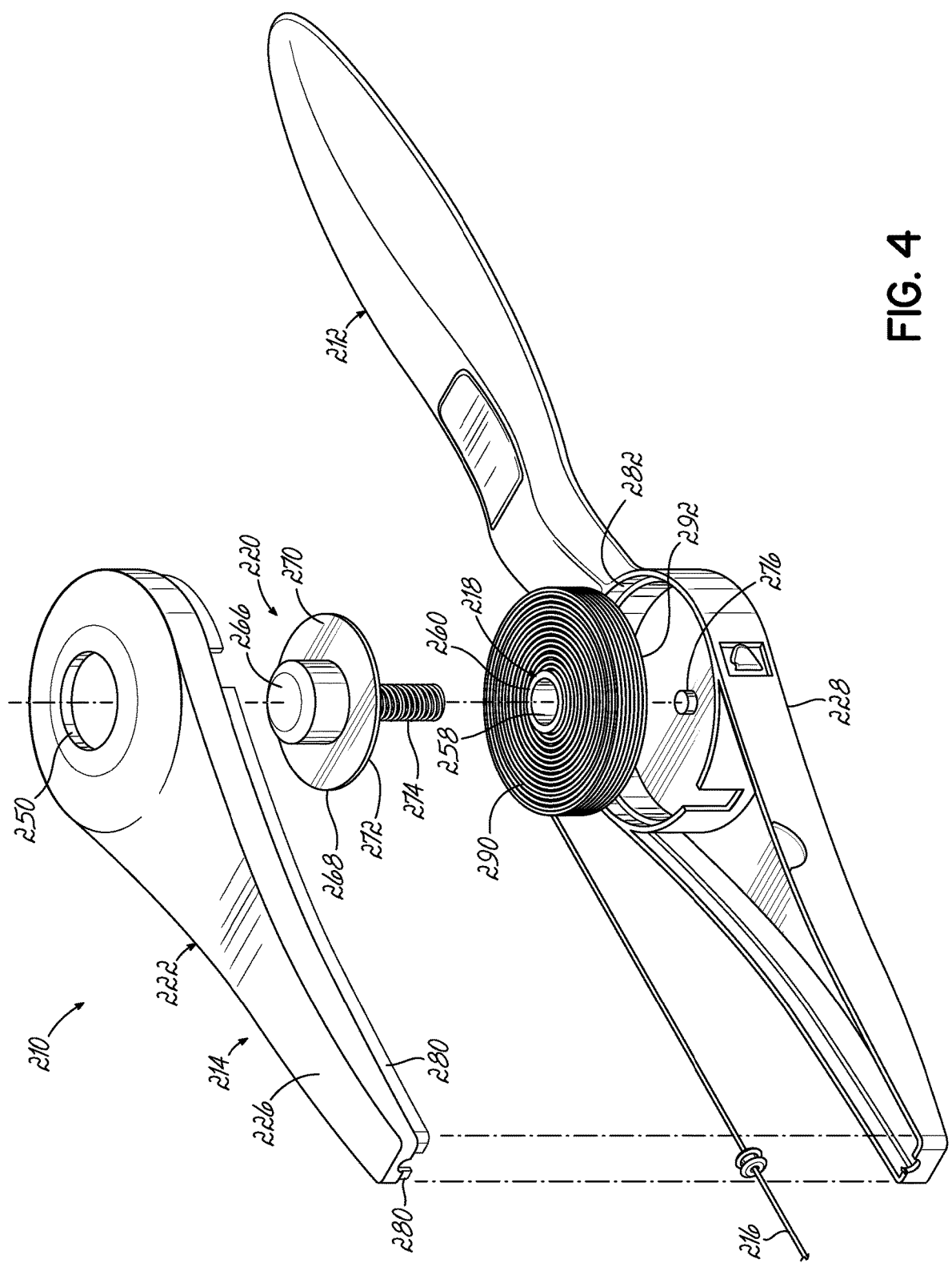
FIGS. 4, 4A, 4B and 4C are exploded perspective views of exemplary dental flossers in accordance with yet other alternative embodiments of the invention.
Figure 4A:
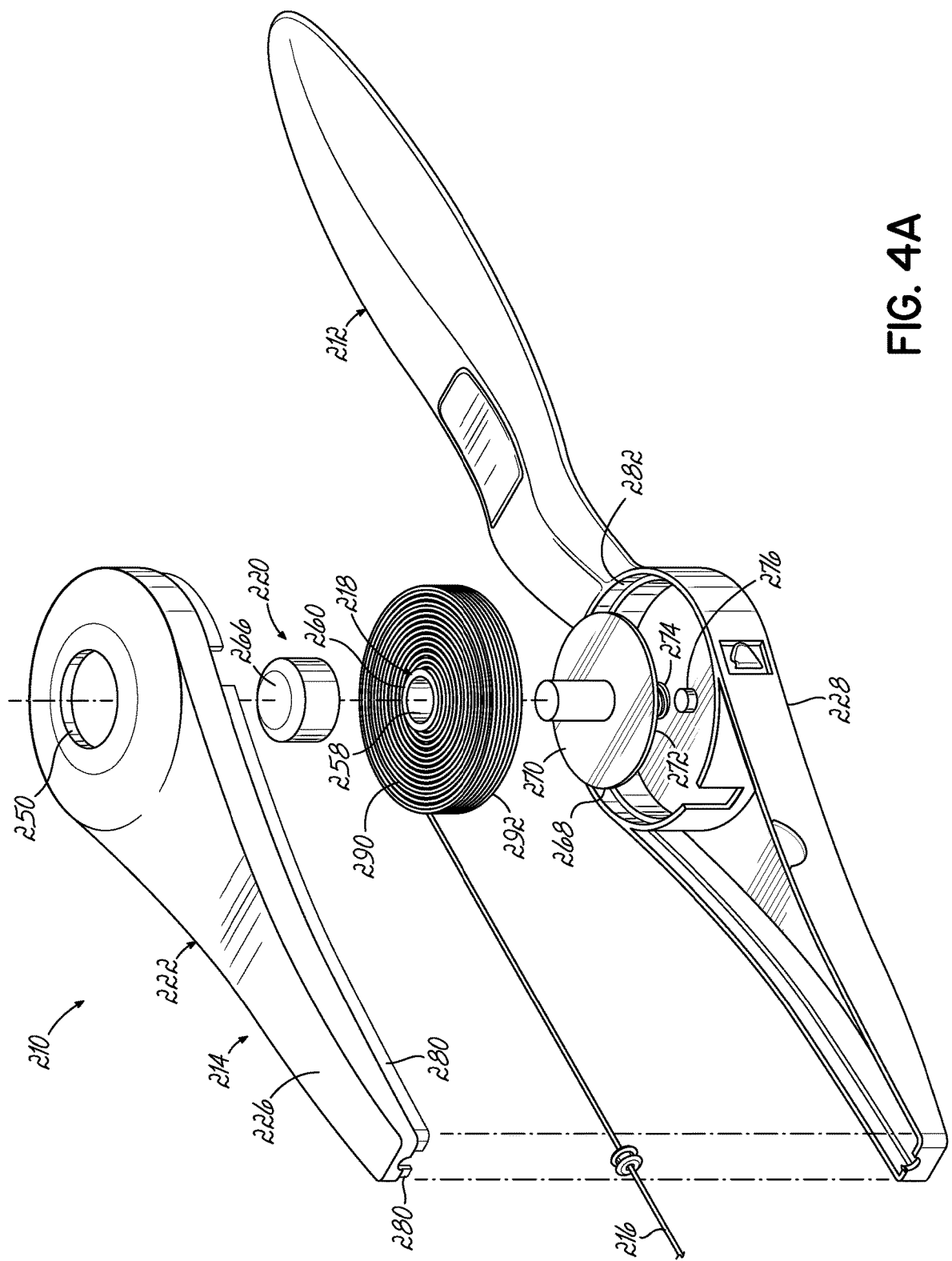
Figure 4B:
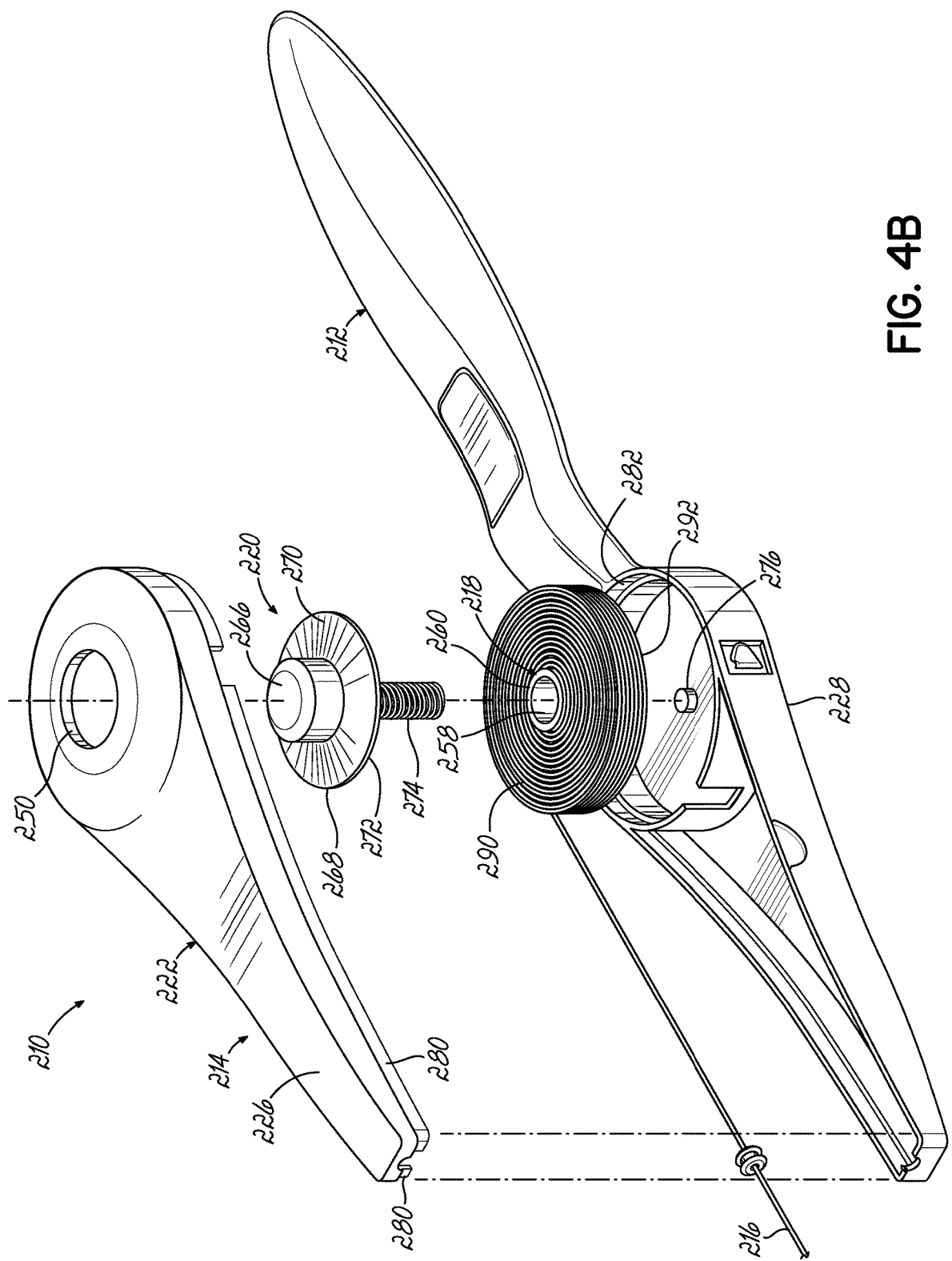
Figure 4C:
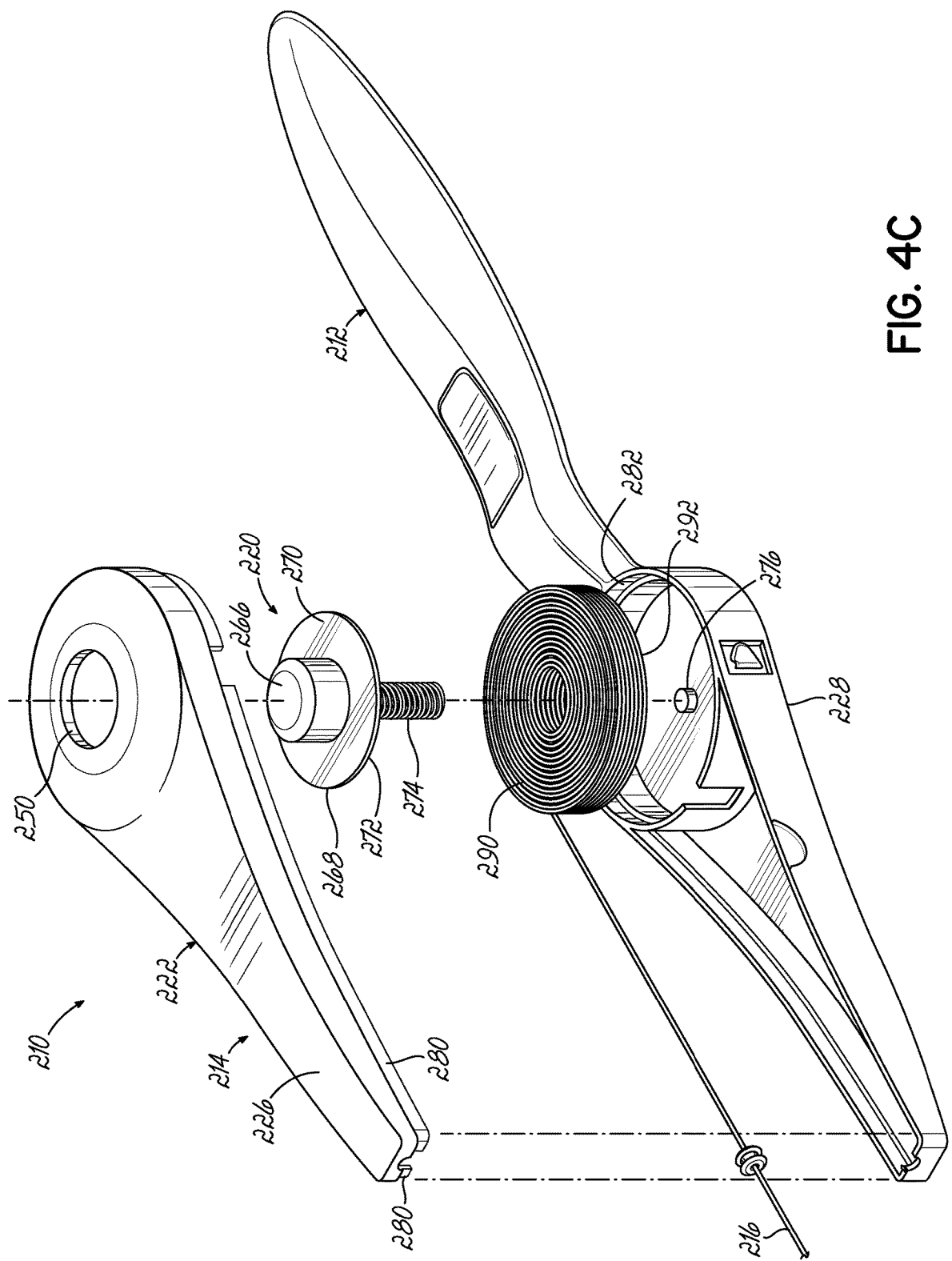

Turning now to FIG. 4, wherein like reference numerals represent like features, an exemplary dual-purpose dental floss holder and dispenser, or dental flosser 210, including a handle 212 coupled to a housing 214 for holding and dispensing dental floss 216 is shown in accordance with yet another embodiment.

In the embodiment shown, the spool 218 of floss 216 is unflanged. More particularly, the spool 218 includes a hollow cylindrical body having an inner bore 258, a top surface 260, a bottom surface, and an outer side surface (not shown).

The actuator 220 includes a generally cylindrical button 266 extending through the aperture 250 of the top housing portion 222. In the embodiment shown, the actuator 220 further includes at least one projection, such as a generally circular flange 268, extending radially outwardly from the button 266. The flange 268 includes top and bottom surfaces 270, 272, and is positioned above the spool 218 such that the bottom surface 272 of the flange 268 opposes the top surface 260 of the spool 218. In this manner, the bottom surface 272 of the flange 268 may be configured to frictionally engage the top surface 260 of the spool 218 to lock the spool 218 against rotation and thereby halt and/or prevent the unwinding of floss 216 from the spool 218. Thus, the frictional engagement between the bottom surface 272 of the flange 268 and the top surface 260 of the spool 218 may at least partially define a locked condition of the spool 218. In one embodiment, the frictional engagement between the bottom surface 272 of the flange 268 and the top surface 260 of the spool 218 may cause the bottom surface of the spool 218 to frictionally engage the bottom wall 228 of the housing 214. In this manner, the spool 218 may be sandwiched between the flange 268 and the bottom wall 228 to further contribute to the locking of the spool 218 against rotation. When the spool 218 is the locked condition, the free end of the floss 216 may be held taut by the user without causing rotation of the spool 218 and unwinding of the supply of floss 216.

The actuator 220 also includes a biasing member, such as a spring 274, positioned between the button 266 and the housing 214 for biasing the button 266, and more particularly the bottom surface 272 of the flange 268, away from the spool 218 such that the spool 218 may be freely rotatable. In the embodiment shown, the spring 274 extends through the inner bore 258 of the spool 218 and is positioned over a guide pin 276 provided on the bottom wall 228. The biasing of the bottom surface 272 of the flange 268 away from the spool 218 by the spring 274 may define an unlocked condition of the spool 218. When the spool 218 is in the unlocked condition, the top surface 270 of the flange 268 may abut the top wall 226 near the aperture 250 to prevent the button 266 from becoming dislodged.

In the embodiment shown, the spool 218 is normally in the unlocked condition. In other words, absent a threshold external force on the button 266, the biasing of the bottom surface 272 of the flange 268 caused by the spring 274 prevents the bottom surface 272 from frictionally engaging the top surface 260 of the spool 218. Upon the application of an external force on the button 266 sufficient to overcome the biasing caused by the spring 274, the button 266 may be depressed toward the bottom wall 228 such that the bottom surface 272 of the flange 268 moves toward and frictionally engages the top surface 260 of the spool 218 to place the spool 218 in the locked condition. Such an external force may be generated, for example, by a user's finger or thumb while gripping the handle 212 with a single hand. Removal of the external force on the button 266 may allow the bottom surface 272 of the flange 268 to be urged away from and disengage the top surface 260 of the spool 218 by the biasing of the spring 274 to return the spool 218 to the unlocked condition. In another embodiment, the flosser 210 may be configured to be normally in the locked condition in a manner similar to the embodiment shown and described with respect to FIG. 3.

While the flange 268 of the actuator 220 has been described as frictionally engaging the spool 218, the flange 268 may additionally or alternatively frictionally engage the supply of floss 216 wound around the spool 218. In this regard, the wound supply of floss 216 may define a top surface 290 and a bottom surface 292. As shown, the bottom surface 272 of the flange 268 opposes the top surface 290 of the wound supply of floss 216. Thus, the bottom surface 272 of the flange 268 may be configured to frictionally engage the top surface 290 of the wound supply of floss 216 to halt and/or prevent the unwinding of floss 216 in manner similar to that previously described with respect to the spool 218. In one embodiment, the flange 268 or other projection of the actuator 220 may be downwardly canted or inclined in order to position at least a portion of the bottom surface 272 closer to the top surface 290 of the wound supply of floss 216 for frictional engagement therewith. In another embodiment, the top surface 270 of the flange 268 may be positioned to oppose the bottom surface 292 of the wound supply of floss 216 for frictional engagement therewith, in a configuration generally similar to that of FIG. 3. In addition or alternatively, the spool 218 may be eliminated such that the wound supply of floss 216 may be spool-less.

Various other aspects of the flosser 210 are similar to those described above with regard to the previous embodiments and will be readily understood, and thus are not repeated here for the sake of brevity.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The present invention in its broader aspects is therefore not limited to the specific details and illustrative examples shown and described. Accordingly, departures may be made from such details without departing from the scope of the general inventive concept.

What is claimed is:

1. A dental flosser, comprising:
   (a) a handle;
   (b) a housing coupled to the handle, the housing including a chamber configured to rotatably receive a spool having an inner bore, an uppermost first top surface, a lowermost first bottom surface, a side surface and a supply of floss wound about the side surface, the supply of floss defining an uppermost second top surface, and a lowermost second bottom surface, the housing further including a floss orifice for directing at least a portion of the supply of floss therethrough; and (c) an actuator including at least one contact surface configured to confront and frictionally engage at least one of the uppermost first top surface, the lowermost first bottom surface, the uppermost second top surface, or the lowermost second bottom surface, the actuator further including a biasing member for biasing the at least one contact surface relative to the spool, wherein the biasing member is configured to extend into and be movable within the inner bore of the spool.

2. The dental flosser of claim 1, further comprising a seal positioned within the floss orifice.

3. The dental flosser of claim 1, further comprising a blade positioned on the housing.

4. The dental flosser of claim 1, wherein the biasing member includes a spring.

5. The dental flosser of claim 1, wherein the actuator includes at least one radially extending projection and wherein the at least one contact surface is positioned on the at least one projection.

6. The dental flosser of claim 5, wherein the at least one projection includes a pair of arms.

7. The dental flosser of claim 5, wherein the at least one projection includes a circular flange.

8. The dental flosser of claim 5, wherein the at least one contact surface is positioned on a bottom of the at least one projection and configured to frictionally engage the uppermost first top surface of the spool to lock the spool against rotation, and wherein the biasing member is configured to bias the at least one contact surface away from the spool.

9. The dental flosser of claim 5, wherein the at least one contact surface is positioned on a top of the at least one projection and configured to frictionally engage the lowermost first bottom surface of the spool to lock the spool against rotation, and wherein the biasing member is configured to bias the at least one contact surface toward the spool.

10. The dental flosser of claim 1, wherein the housing includes a top housing portion and a bottom housing portion removably coupled together.

11. The dental flosser of claim 1, wherein the chamber is circular.

12. The dental flosser of claim 1, wherein the housing includes an aperture that intersects with the chamber and wherein the actuator includes a button extending through the aperture.

13. A dental flosser, comprising:
(a) a handle;
(b) a housing coupled to the handle, the housing including a chamber and a floss orifice;
(c) a spool rotatably received in the chamber, the spool having an inner bore, an uppermost first top surface, a lowermost first bottom surface, a side surface and a supply of floss wound about the side surface, the supply of floss defining an uppermost second top surface and a lowermost second bottom surface, wherein at least a portion of the supply of floss is configured to be directed through the floss orifice of the housing; and
(d) an actuator including at least one contact surface configured to confront and frictionally engage at least one of the uppermost first top surface, the lowermost first bottom surface, the uppermost second top surface, or the lowermost second bottom surface, the actuator further including a biasing member for biasing the at least one contact surface relative to the spool, wherein the biasing member extends into and is movable within the inner bore of the spool.

14. The dental flosser of claim 13, wherein the spool includes a cylindrical body and wherein the uppermost first top and lowermost first bottom surfaces are positioned on the cylindrical body.

15. The dental flosser of claim 13, wherein the spool includes a cylindrical body and top and bottom flanges extending radially outwardly from the cylindrical body, and wherein the uppermost first top and lowermost first bottom surfaces are positioned on the top and bottom flanges, respectively.

16. The dental flosser of claim 13, wherein the uppermost first top surface of the spool is planar between the inner bore and an outer edge of the spool.

17. The dental flosser of claim 13, wherein the uppermost first top surface of the spool has a circular outer periphery and a circular inner periphery.

18. The dental flosser of claim 17, wherein the uppermost first top surface of the spool is planar between the circular inner periphery and the circular outer periphery.

19. The dental flosser of claim 13, wherein a radially outer surface of the biasing member directly confronts a radially inner surface of the inner bore of the spool.

20. A dental flosser, comprising:
(a) a handle;
(b) a housing coupled to the handle, the housing including:
(i) a top wall,
(ii) a bottom wall,
(iii) a chamber defined between the top and bottom walls,
(iv) a guide pin extending upwardly from the bottom wall into the chamber,
(v) an aperture extending through the top wall and vertically aligned with the guide pin, and
(vi) a floss orifice;
(c) a spool rotatably received in the chamber of the housing, the spool having:
(i) a cylindrical outer side surface,
(ii) a cylindrical inner bore,
(iii) an annular uppermost top surface extending from the cylindrical inner bore to the cylindrical outer side surface, wherein the annular uppermost top surface is planar, and
(iv) a supply of floss wound about the cylindrical outer side surface, wherein at least a portion of the supply of floss extends through the floss orifice of the housing; and
(d) an actuator including:
(i) a button extending through the aperture,
(ii) a circular flange extending radially outwardly from the button, the circular flange having:
(A) an annular top surface configured to abut the top wall of the housing radially outwardly of the aperture, and
(B) an annular bottom surface confronting the annular uppermost top surface of the spool and configured to frictionally engage the annular uppermost top surface of the spool, and
(iii) a helical spring positioned between the button and the bottom wall of the housing, wherein the helical spring extends through and is movable within the cylindrical inner bore of the spool, wherein the helical spring is positioned over the guide pin of the housing, wherein the helical spring is configured to bias the annular bottom surface of the circular flange upwardly away from the annular uppermost top surface of the spool.

\* \* \* \* \*